United States Patent [19]

Janiak et al.

[11] Patent Number: 4,821,284

[45] Date of Patent: Apr. 11, 1989

[54] SCRAP-MELTING PROCESS AND ELECTRIC FURNACE FOR CARRYING OUT THE PROCESS

[75] Inventors: Robert A. Janiak, Saint-Genest-Malifaux; Georges J. Davené, Marly Le Roi, both of France

[73] Assignee: Clecim, Courbevoie, France

[21] Appl. No.: 79,363

[22] Filed: Jul. 30, 1987

[30] Foreign Application Priority Data

Aug. 1, 1986 [FR] France ................................ 86 11215

[51] Int. Cl.$^4$ .............................................. H05B 7/11
[52] U.S. Cl. ..................................... 373/107; 373/108
[58] Field of Search ................ 373/107, 108, 102, 103

[56] References Cited

U.S. PATENT DOCUMENTS 4,038,483  7/1977  Stenkvist ............................. 373/108
4,550,413  10/1985  Lassander et al. ................... 373/108

*Primary Examiner*—Roy N. Envall, Jr.
*Attorney, Agent, or Firm*—Pollock, Vande Sande & Priddy

[57] ABSTRACT

A set of conductors comprising at least two return conductors (5) connected to a hearth electrode (3) is arranged along the outer face (11) of the furnace vessel in direct proximity thereto, and the profile and orientation of at least two conductors of the set are determined, in order, as a result of the passage of a direct current of controlled intensity, to generate magnetic fields of which the mutual deflection effects on the arcs, taking into account all the magnetic influences exerted by the other conductors and the various parts of the installation during operation, are such that the arcs are directed towards a specific zone of the molten-metal bath.

5 Claims, 2 Drawing Sheets

SCRAP-MELTING PROCESS AND ELECTRIC FURNACE FOR CARRYING OUT THE PROCESS

FIELD OF THE INVENTION

The invention relates to a process for melting ferrous raw material, especially scrap, and an electric electric furnace for carrying out the process.

BACKGROUND OF THE INVENTION

It has long been known to use electric furnaces for melting scrap or other ferrous raw material and reducing the resulting molten-metal bath, if appropriate with the addition of alloying elements, until a metal of specific composition is obtained.

In general terms, an electric furnace comprises a vessel limited by a sidewall and a bottom, covered with a hearth made of refractory material, and closed by a removable, vaulted cover, through which passes at least one electrode which is usually consumable and which consists of a graphite bar mounted so as to be vertically slidable, so that it can descend within a furnace batch, normally scrap, which is in contact with at least one fixed electrode located in the hearth.

In the case of a single-phase alternating-current furnace or a continuous-current furnace, the consumable electrode and the hearth electrode are connected to the two poles of a current source.

In the case of a two-phase or three-phase alternating current furnace, the consumable electrodes are connected to the poles of the current source, and the batch in contact with the hearth electrode constitutes the neutral conductor of the system.

One or more electric arcs thus form between the batch and each consumable electrode, and these cause the melting of the scrap and the formation of a molten-metal bath in the bottom of the vessel.

Until now, furnaces supplied with alternating current have been preferred, but it has been found that feeding the electrodes with direct current afforded many advantages, such as a reduction in noise and an increase in energy efficiency, because it is possible to use voltages higher than those allowed with alternating current.

However, to date, the use of very high direct current intensities has been avoided, because, since the currents always circulate in the same direction in the conductors, the electrodes and the bath generate considerable magnetic fields which deflect the arcs. Furthermore, for high powers several hearth-electrodes and return conductors, usually three, are used, and these likewise generate fields which exert substantial deflection effects on the arcs.

As long as the batch is in the form of scrap, the electrodes penetrate into the latter, at the same time digging in it pits which, in a sense, insulate the arcs from one another and promote their stability. By contrast, when the batch is melted completely, the arcs subjected to the magnetic effects generated as a result of the passage of current through the electrodes, the conductors and other parts of the apparatus can form in upredictable directions and are therefore highly unstable.

The zone in which the arcs form and which is at the highest temperature consequently cannot be kept in the center of the furnace, the walls and bottom of which can be subjected to excessive temperatures and to considerable wear of the refractory.

To overcome these disadvantages, the aim until now has been to provide installations which are as symmetrical as possible, so that the magnetic fields generated as a result of the circulation of the current in the various conductors balance one another and the arc or arcs are kept vertical.

For example, in DE-A-3,414,392, all the conductors are made to arrive at one and the same point which is located underneath the bottom of the vessel on the axis of the latter, and from whence the conductors radiate in symmetrical directions, the negative conductors rising vertically along the sidewall and then linking up with flexible conductors for connection to the consumable electrode located in the center of the vault.

Such an arrangement increases the length of the conductors and consequently the cost of the installation, and in practice it is very difficult to achieve perfect symmetry, since it is necessary to take into account not only the circuit of the conductors, but also many other disruptive influences.

Furthermore, this increases the crowding of the space which is located underneath the vessel and which it is preferable to keep free.

SUMMARY OF THE INVENTION

The object of the invention is a process making it possible to control the arcs more effectively and also to direct them towards a specific zone of the furnace, without necessarily seeking to keep the arcs vertical.

In general, this zone is the central zone of the hearth, so as to avoid overhearting of the walls, but it can also be offset relative to the axis, for example at a location where the cold scrap and/or additives are introduced.

According to the invention, a set of conductors comprising at least two return conductors, each connected to a hearth electrode, is arranged along the outer face of the vessel and in its immediate vicinity, and the profile and orientation of at least two conductors of this set are so determined as to generate, as a result of the passage of a direct current of controlled intensity, magnetic fields of which the mutual deflection effects on the arcs, taking into account all the magnetic influences exerted by the other conductors and the various parts of the installation during operation, are such that the arcs are directed towards a specific zone of the molten-metal bath.

In a particularly advantageous way, the conductors, the profile of which is determined in order to regulate the convergence of the arcs, are the return conductors located under the bottom of the shaft. The path of these conductors along the bottom of the vessel is so determined that the resultant of the forces exerted on the arcs by the magnetic fields generated as a result of the passage of the current is reduced as much as possible.

In another embodiment, additional conductors are arranged along the wall of the vessel, the positions and orientations of these are determined and currents of controlled intensity are passed through them, so as to generate magnetic fields capable of directing the arcs towards a specific zone of the bath.

According to another possible characteristic of the process according to the invention, the thickness and/or nature of the metal forming the bottom of the vessel are determined, in such a way that this bottom forms a magnetic screen capable of minimizing the effects of the passage of current on the arcs.

The invention also covers an improved electric furnace for carrying out the process, equipped with at least two return conductors arranged along the outer face of the bottom of the vessel and each comprising a first part extending radially away from the zone of the electrodes to a distance at which the magnetic field generated as a result of the passage of current has a negligible influence on the electric arc, and a second art for connection to the current source, the first parts of the conductors extending away in divergent directions determined in view of the lay-out possibilities on the bottom of the vessel, so that, for an ideal total length of the set of return conductors, the magnetic fields generated as a result of the passage of current in the said conductors cause, by mutual compensation, an overall deflection effect which, taking into account all the magnetic influences exerted on the arcs, is such that the latter are directed towards a specific zone of the molten-metal bath.

BRIEF DESCRIPTION OF THE DRAWINGS

The invention will be illustrated further by the following description of several embodiments given by way of example and shown in the accomanying drawings.

DESCRIPTION OF PREFERRED EMBODIMENT

Figure 1:
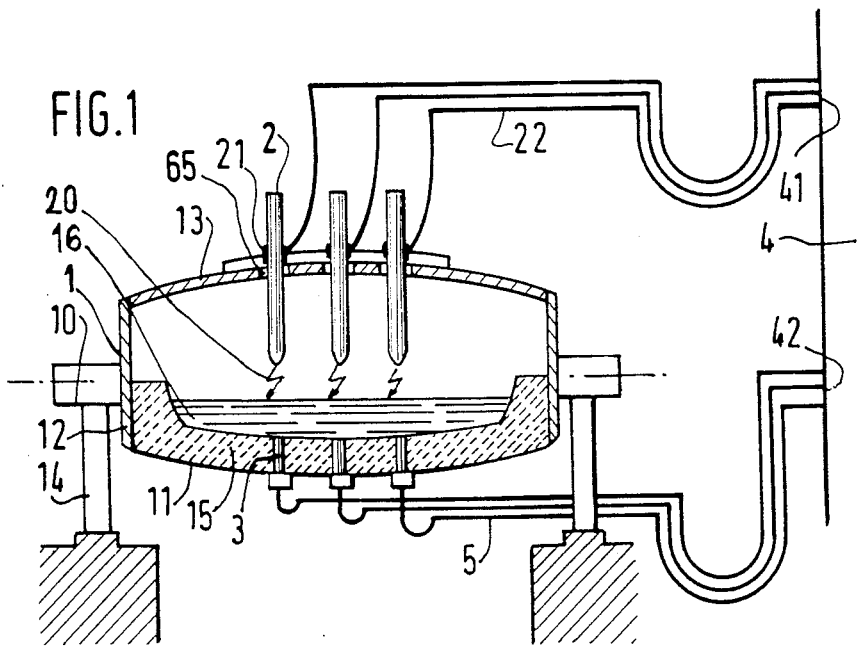
FIG. 1 is a schematic elevation view of an electric scrap-melting furnace.

FIG. 1 shows diagrammatically an electric scrap-melting furnace comprising a vessel 1 delimited by a bottom 11 and a side wall 12 and closed by a removable cover in the form of a vault 13. The vessel is supported by rolling or pivoting bearings 14 allowing it to be tilted about a horizontal axis, for examples so as to discharge the slag on one side and the molten metal on the other side. The casting holes and the scrap loading orifice have not been shown.

Mounted on the vault 13 are consumable electrodes, for example three electrodes 2, consisting of graphite bars which are mounted on the vessel so as to slide vertically in passages 65, a device 21 serving as electrical connection. The means for the progressive lowering of the electrodes 2 have not been shown.

The bottom 11 of the vessel 1 is covered with a hearth 15 made of refractory material, in which are incorporated fixed electrodes 3 which pass through the bottom 11. Located near the shaft 1, but at a sufficient distance to be protected from the heat and splashes of metal, is a direct-current source 4, for example a transformer-rectifier having two poles, namely a negative pole 41 connected to the consumable electrodes 2 by means of feed conductors 22 and a positive pole 42 connected to the hearth electrodes 3 by means of return conductors 5.

By means of these conventional arrangements, the passage of current in the electrodes causes electric arcs 20 to form between the electrodes 2 and the scrap which, as a result of melting, forms a bath 16 of liquid metal. The passage of current is continued until complete melting and until the desired composition is obtained as a result of the addition of alloying elements.

In order as far as possible to prevent the magnetic fields generated as a result of the passage of current in the conductors from exerting an influence on the electric arcs, it is preferable for the conductors to leave in a vertical direction parallel to the electrodes, up to a sufficient distance to ensure that the horizontal parts of the conductors connected to the current source 4 do not have any appreciable influence on the arcs. This is the solution shown in the Figure for the vault electrodes 2. A similar solution could be adopted for the return conductors 5, but the disadvantage of such an arrangement is that the conductors go through the zone which is located underneath the vessel and in which it is expedient to leave a passage for the supporting carriages of the pouring ladles.

If the conductors 5 are brought nearer to the vessel, the effects on the arcs of the magnetic fields generated as a result of the passage of current in the conductors are increased, and instead of seeking to avoid such effects, for example by moving the conductors away from the bottom of the vessel as far as possible, the objective, on the contrary, is to bring them nearer to the vessel, in order to utilize the magnetic fields generated as a result of the passage of current, so as to control the positioning of the arc formation zone by careful routing of the conductors.

In fact, the idea was to make use of current computation possibilities to allow for all the elements which can effect the orientation of the arcs, and to develop a mathematical model making it possible to select the routing of the conductors by calculating the foreseeable behavior of the arcs with a relatively high degree of accuracy.

According to the possibilities for laying the conductors, the return conductors connected to the hearth electrodes can be used for this purpose, if they are made to follow a particular route along the bottom of the vessel or, in some cases, the sidewalls, but additional conductors can also be added under the vessel or round the shell 12, so as to generate artificially magnetic fields of controlled intensity and orientation, in order to compensate the magnetic fields generated by the conductors and, in general terms, all the elements acting on the arcs.

FIGS. 2 to 5 show by way of example various possible arrangements of the return conductors.

In general terms, in a first step of the process, the effects on the arcs of all the elements through which a current passes are caluclated, for example by means of a mathematical model, taking into account the current intensity, the magnetic characteristics of the various parts of the shaft, the change undergone by the batch and, in particular, the rise in temperature during the various phases of melting, etc. In this calculation, a distinction is made between the elements whose characteristics and positioning are fixed in advance, and those on which action can be taken. Furthermore, the calculation also includes the lengths of the conductors, and in a second step the arrangement requiring a minimum length of conductors for the most effective possible control of the positioning of the arcs and their convergence towards a selected zone of the molten-metal bath is determined. For this purpose, a compromise is chosen between the routing of the conductors ensuring compensation of the fields and the increase in length which results from this and which increases the price of the conductors and the current losses. In general terms, the most economical path of the conductors in order to obtain the best possible compensation of the magnetic fields will therefore be defined.

FIGS. 2 to 5 show schematically, in plan view, the arrangement of the hearth electrodes 3 and the return conductors 5.

In FIGS, 2 to 4, as will generally be the case, three hearth electrodes 31, 32, 33 are arranged in the form of a triangle in the central part of the vessel 1. In contrast, in FIG. 5, a single hearth electrode 34 located in the center of the vessel is used. The transformer-rectifier 4 is still arranged in the upper part of the figure.

The distance L between the lateral electrodes 32, 33 and the distance l between the central electrode 31 and the plane of the lateral electrodes can vary according to circumstances, in paticular according to the lay-out possibilities of the consumable electrodes 2 and the batch loading means.

Moreover, even when a single central electrode 34 is used, it is preferable to arrange under the vessel three return conductors 5 which allow the magnetic fields generated to be balanced more effectively. Also, each conductor comprises, in general, a first part extending away from the corresponding hearth electrode and along the bottom of the shaft and a second part for direct connection to the transformer-rectifier.

The first part 511 of the central conductor 51 can be directed either directly towards the transformer 4 or in the opposite direction, while the first parts 521 and 531 of the lateral conductors 52 and 53 extend away from the zone of the electrodes in divergent directions forming opposite angles A and A' with the direction of the conductor 511.

Figure 2:
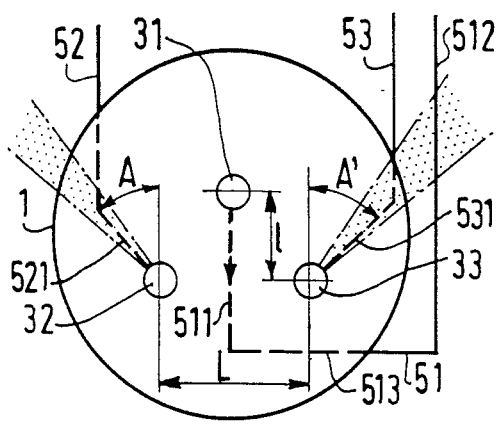
FIGS. 2 to 5 show diagrammatically various examples of the routing of the return conductors.

In FIG. 2, the first part 511 of the central conductor 51 leaves in the opposite direction to the transformer 4, passing between the electrodes 32 and 33, and is connected to the connection part 512 by means of a bend 513. Here, the angles A and A' between the first parts 521, 531 of the conductors 52, 53 and the direction of the transformer can be between 45° and 60°, the orientation being defined according to the lay-out possibilities in order to obtain the best possible compensation of the fields generated. The first parts 511, 521 and 531 of the conductors are extended in substantially rectilinear directions to such a distance that, starting from the bend, the fields generated by the connection parts can have only a negligible influence on the arcs.

Figure 3:
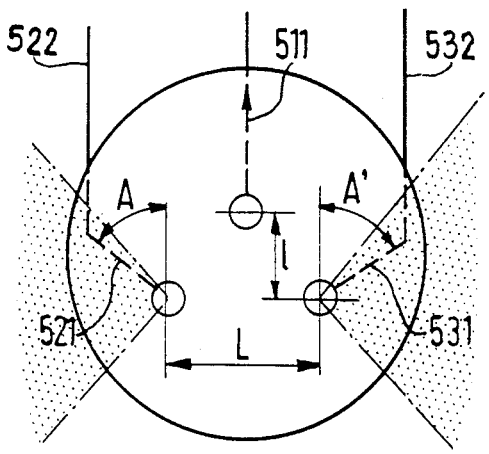

In FIG. 3, the first part 511 of the central conductor 40 goes directly towards the transformer 4 in a direction perpendicular to the plane of the electrodes 32 and 33. Here, the angles A and A' which the first parts 521 and 531 of the lateral conductors form with this direction can be between 45° and 135°. It will be seen that, in this case, there is a relatively wide possible choice for the orientation of the lateral conductors, and the length of the central conductor 51 is reduced to a minimum.

Figure 4:
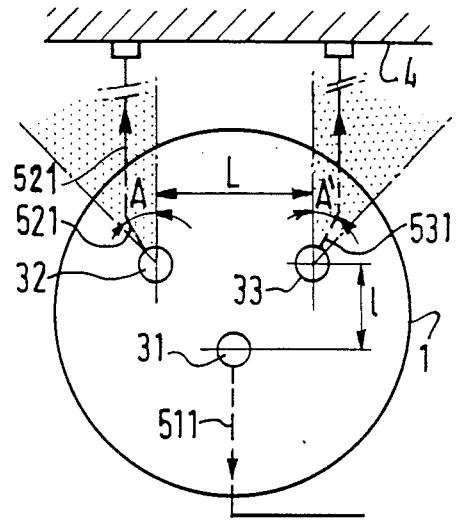

In FIG. 4, the central electrode 31 is located on the opposite side to the transformer 4 in relation to the plane passing through the lateral electrodes 32 and 33. In this case, the first part 511 of the central conductor extends in the opposite direction to the transformer 4, and the angles A and A' of the conductors 521, 531 can be between 0° and 45°.

Figure 5:
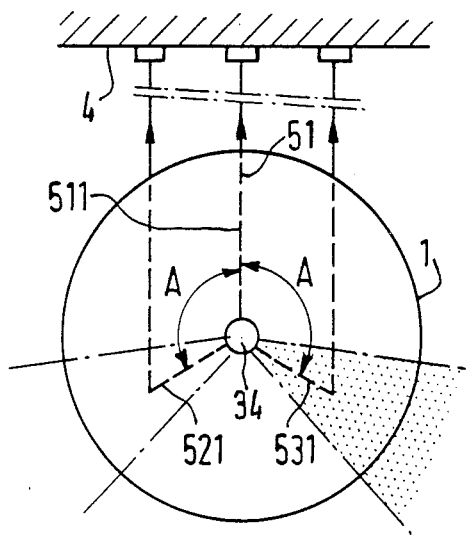

In FIG. 5, the bottom 11 of the vessel is equipped with a single hearth electrode 34. However, as mentioned, this is connected to the transformer by means of three conductors 51, 52, 53, thus making it possible, on the one hand, to distribute the electrical power and, on the other hand, to ensure compensation of the fields, allowing the electric arc to be maintained in a selected direction.

In this case, the central conductor 51 goes directly towards the transformer 4, and the first parts 521, 531 of the lateral conductors 52, 53 are directed symmetrically in radial directions forming angles A and A' of between 105° and 135° with the direction of the conductor 51.

It will be seen that many arrangements can be adopted as a function of the electrical powers used and consequently of the number and distibution of the electrodes and conductors, the magnetic characteristics of the various parts of the installation, particularly the bottom, and the routing possibilities along the bottom of the vessel.

But it is also possible, especially when the crowding of the bottom of the vessel prevents the return conductors from being given the orientations desired, to compensate the effects of the conductors by means of induction coils arranged round the side wall of the vessel and near thereto.

Figure 6:
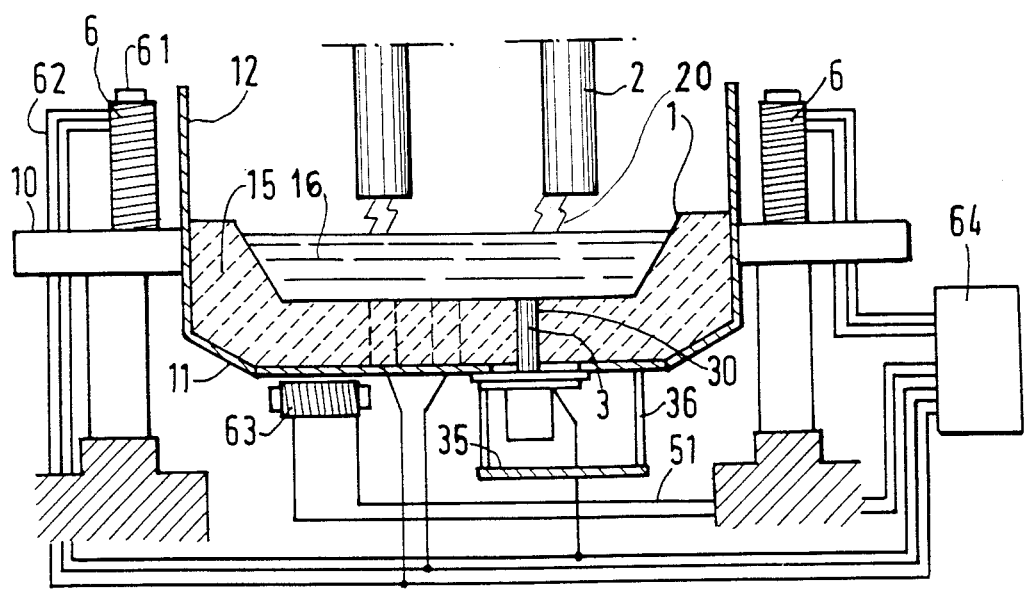
FIG. 6 shows schematically, in elevation, a furnace vessel equipped with another device for putting the invention into practice.

Such an arrangement has been shown schematically in FIG. 6 which illustrates, in a vertical section through the axis of a hearth electrode, a vessel 1 mounted on a tilting floor 10 and equipped with hearth electrodes associated with consumable electrodes 2.

Mounted on the floor 10 as near as possible to the sidewall 12 of the vessel are induction coils 6, each comprising a soft-iron core 61 surrounded by a winding set consisting of one or more windings fed with direct current at an independent and variable intensity. For this purpose, each coil 6 can be connected directly to the direct-current source 4 and, for a better balancing of the intensities, comprise three windings connected by means of conductors 62 to the three phases of the transformer 4 via rectifiers. But it is also possible to feed the coils directly with the return current of the hearth electrodes 3 by connecting them in parallel to the return conductors 51, as shown in FIG. 6.

Furthermore, the induction coils can also be arranged under the shaft 11, as showm at 63.

In general terms, the positions and orientations of the coils 6 are so determined that the passage of the current in the coils generates magnetic fields, of which the effects on the arcs compensate the magnetic effects caused by the other parts of the installation. In a further-improved embodiment, it is possible to control the intensities in the coils 6 by means of a regulating device 64, so that the electric arcs are directed towards a selective zone of the bath, and even to shift this zone continuously, to maintain all the parts of the shaft at the same temperature.

Thus, whereas the magnetic effects of the return conductors were utilized in the preceding embodiments, in the last case the arcs are centered by means of additional fields which compensate the effects of the return conductors.

However, even if the arrangements just described make it possible, according to the invention, to neutralize or compensate the effects of the magnetic fields generated as a result of the passage of current in the return conductors, it is nonetheless still expedient to minimize these effects as much as possible. To achieve this, it is useful to provide a screen against the magnetic fields generated by the return conductors 51, by increasing the permeability of the vessel bottom 11 placed under the refractory hearth 15, for example by increasing the thickness of the bottom or producing it from a special metal alloy of high relative magnetic permeability. The thicknesses and/or the choice of alloys will be determined according to the current intensities passing through the return conductors 51.

On the other hand, the hearth electrodes 3, which are made of copper in the normal way and at all events of non-magnetic material, pass through the bottom 11 and therefore provide in the latter orifices 30 which allow the field lines to pass through. In order to increase the magnetic protection afforded by the bottom, it is therefore preferable to arrange round the return conductors magnetic screens 35 taking the form of shrouds or simple disks which are made of sheet metal of large thickness or of metal alloy with special magnetic properties, and which cover most of the length of the horizontal conductor 51, in order to mask it relative to the passage orifice 30 of the hearth electrodes 3. These disks can consist of a stack of metal sheets suspended on the bottom of the vessel by means of tie rods 36.

We claim:

1. An electric direct-current metal melting furnace comprising
   (a) a vessel (1) delimited by a bottom (11) covered by a refractory hearth (15), and a sidewall (12), and closed by a removable cover in the form of a vault (13);
   (b) means for loading raw material into said vessel (1);
   (c) means for melting said raw material to form a molten-metal bath, said means for melting comprising
      (i) a plurality of consumable vault-electrodes mounted for vertical displacement through said vault (13) and generating an electric arc;
      (ii) at least one fixed electrode (3) passing through said bottom (11) in a predetermined zone;
      (iii) a direct-current source (4) having a negative pole (41) connected to said consumable vault-electrodes, respectively, by means of a plurality of feed conductors (22), and a positive pole (42) connected to said at least one hearth-electrode by means of at least two return conductors (51, 52);
      (iv) said return conductors (51, 52) being arranged along an outer face (11) of said bottom of said vessel and each comprising a first part (511, 521) extending away from said zone of said electrodes (3) to a distance at which a magnetic field generated by a passage of current has a negligible influence on the electric arc, and a second part (512, 522) for connection to said current source (4); and
      (v) said first parts (511, 521) of said conductors extending away in specific divergent directions, allowing for layout variations on the bottom of said vessel such that, for an ideal total length of a set of return conductors (5), magnetic fields generated by the passage of current in said conductors cause, by mutual compensation, an overall deflection effect which is such that, taking into account all the magnetic influences exerted on the arcs (20), the latter are directed towards a specific zone of said molten-metal bath.

2. An electric direct-current metal-melting furnace comprising
   (a) a vessel (1) delimited by a bottom (11) covered by a refractory hearth (15), and a sidewall (12), and closed by a removable cover in the form of a vault (13);
   (b) means for loading raw material into said vessel (1);
   (c) means for melting said raw material to form a molten-metal bath, said means for melting comprising
      (i) a plurality of consumable vault-electrodes mounted for vertical displacement through said vault (13) and generating an electrical arc;
      (ii) at least three fixed hearth-electrodes (3) passing through said bottom (11), and comprising a central electrode (31) and at least two lateral electrodes (32, 33);
      (iii) a direct-current source (4) having a negative pole (41) connected to said consumable vault-electrodes, respectively, by means of a plurality of feed conductors (22), and a positive pole (42) connected to said at least three hearth-electrodes (3) by means of at least three return conductors (51, 52, 53);
      (iv) said return conductors (51, 52, 53) being arranged along an outer face (11) of said bottom of said vessel and each comprising a first part (511, 521) extending away from said zone of said electrodes (3) to a distance at which a magnetic field generated by a passage of current has a negligible influence on the electric arc, and a second part (512, 522) for connection to said current source (4); and
      (v) said return conductors (51, 52, 53) comprising a central conductor (51) having a first part (511) extending in a direction opposite to said current-source (4) and passing between said lateral electrodes (32, 33) and connected to the second part (512) by a bend (513), and at least two lateral conductors (52, 53) having first parts (521, 531) extending in divergent directions forming respectively opposite angles (A and A') of between 45° and 60° with the direction of said first part (511) of said central conductors (51).

3. An electric direct-current metal-melting furnace comprising
   (a) a vessel (1) delimited by a bottom (11) covered by a refractory hearth (15), and a sidewall (12), and closed by a removable cover in the form of a vault (13);
   (b) means for loading raw material into said vessel (1);
   (c) means for melting said raw material to form a molten-metal bath, said means for melting comprising
      (i) a plurality of consumable vault-electrodes mounted for vertical displacement through said vault (13) and generating an electric arc;
      (ii) at least three fixed hearth-electrodes (3) passing through said bottom (11);
      (iii) a direct-current source (4) having a negative pole (41) connected to said consumable vault-electrodes, respectively, by means of a plurality of feed conductors (22), and a positive pole (42) connected to said at least three hearth-electrodes by means of at least three return conductors (51, 52, 53);
      (iv) said return conductors (51, 52, 53) being arranged along an outer face (11) of said bottom of said vessel and each comprising a first part (511, 521) extending away from said zone of said electrodes (3) to a distance at which a magnetic field generated by a passage of current has a negligible influence on the electric arc, and a second part (512, 522) for connection to said current source (4);
      (v) said at least three hearth-electrodes (31, 32, 33) comprising a central electrode (31) and at least two lateral electrodes (32, 33), located in the same plane, said central electrode (31) being located on the side opposite to said current-source (4) in relation to said plane passing through said lateral electrodes (32, 33); and (vi) said return conductors (52, 52, 53) comprising a central conductor (51) connected to said central electrode (31) and having a first part (51) extending in a direction opposite to said current-source (4) and at least two lateral conductors (52, 53) respectively connected to said lateral electrodes (32, 33) and having first parts (521, 531) extending in divergent directions forming respectively opposite angles A and A' of between 0° and 45° with the direction of said first part (511) of said central conductor (51).

4. An electric direct-current metal-melting furnace comprising
   (a) a vessel (1) delimited by a bottom (11) covered with a refractory hearth (15), and a sidewall (12), and closed by a removable cover in the form of a vault (13);
   (b) means for loading raw material into said vessel (1);
   (c) means for melting said raw material to form a molten-metal bath, said means for melting comprising
      (i) a plurality of consumable vault-electrodes mounted for vertical displacement through said vault (13) and generating an electric arc;
      (ii) at least three fixed hearth-electrodes (3) passing through said bottom (11) and comprising a central electrode (31) and at least two lateral electrodes (32, 33);
      (iii) a direct-current source (4) having a negative pole (41) connected to said consumable vault-electrodes, respectively, by means of a plurality of feed conductors (22), and a positive pole (42) connected to said at least three hearth-electrodes by means of at least three return conductors (51, 52, 53);
      (iv) said return conductors (51, 52, 53) being arranged along an outer face (11) of the bottom of said vessel and each comprising a first part (511, 521) extending away from the zone of the electrodes (3) to a distance at which a magetic field generated by a passage of current has a negligible influence on the electric arc, and a second part (512, 522) for connection to said current source (4); and (v) said return conductors (52, 52, 53) comprising a central conductor (51) extending directly towards said current-source (4) and at least two lateral conductors (52, 53) having first parts (521, 531) extending in divergent directions forming respectively opposite angles A and A' of between 45° and 135° with the direction of said central conductor (51).

5. An electric direct-current metal-melting furnace comprising
   (a) a vessel (1) delimited by a bottom (11) covered with a refractory hearth (15), and a sidewall (12), and closed by a removable cover in the form of a vault (13);
   (b) means for loading raw material into said vessel (1);
   (c) means for melting said raw material to form a molten-metal bath, said means for melting comprising
      (i) a plurality of consumable vault-electrodes mounted for vertical displacement through said vault (13);
      (ii) one fixed electrode (3) passing through said bottom (11) in the center of said vessel;
      (iii) a direct-current source (4) having a negative pole (41) connected to said consumable vault-electrodes, respectively, by means of a plurality of feed conductors (22), and a positive pole (42) connected to said fixed hearth-electrode (3) by means of three return conductors (51, 52, 53), arranged along an outer face (11) of the bottom of said vessel;
      (iv) said return conductors comprising a central conductor (51) extending directly towards said current-source (4) and two lateral conductors (52, 53) each comprising a first part (521, 531) extending away from the zone of the electrodes (3) to a distance at which a magnetic field generated as a result of a passage of current has a negligible influence on the electric arc, and a second part (512, 522) for connection to said current source (4);
      (v) said first parts (521, 531) of said lateral conductors (52, 53) extending symmetrically in radial directions forming angles (A and A') of between 105° and 135° with the direction of said central conductor (51).

* * * * *